United States Patent
Masaoka

(10) Patent No.: US 7,078,861 B2
(45) Date of Patent: Jul. 18, 2006

(54) VEHICLE LAMP CONTROLLING DEVICE AND VEHICLE LAMP CONTROLLING METHOD

(75) Inventor: Hiroaki Masaoka, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/998,095

(22) Filed: Nov. 24, 2004

(65) Prior Publication Data

US 2005/0110415 A1    May 26, 2005

(30) Foreign Application Priority Data

Nov. 26, 2003   (JP) .............................. 2003-395423

(51) Int. Cl.
*B60Q 1/02*        (2006.01)
(52) U.S. Cl. ...................... 315/82; 315/83; 315/200 A; 307/10.8; 340/479
(58) Field of Classification Search ................ 315/77, 315/80, 82, 83, 200 A; 340/463, 464, 467–469, 340/471, 479; 307/10.8
See application file for complete search history.

(56) References Cited

U.S. PATENT DOCUMENTS

| 4,663,609 A | 5/1987 | Rosario | 340/479 |
|---|---|---|---|
| 4,871,945 A | 10/1989 | Smith et al. | 315/77 |
| 4,956,633 A | 9/1990 | Waterson et al. | 340/471 |
| 4,987,405 A | 1/1991 | Jakobowski | 340/479 |
| 5,139,115 A | 8/1992 | Browne et al. | 340/463 |
| 5,404,130 A | 4/1995 | Lee et al. | 340/479 |
| 5,442,333 A | 8/1995 | Bailey | |
| 5,565,841 A | 10/1996 | Pandohie | 340/479 |
| 2002/0047531 A1 | 4/2002 | Sugimoto et al. | 315/82 |
| 2004/0183462 A1* | 9/2004 | Frank et al. | 315/219 |

FOREIGN PATENT DOCUMENTS

| JP | 1-158340 | 6/1989 |
|---|---|---|
| JP | 2-100850 | 4/1990 |
| WO | WO 01/92061 A1 | 12/2001 |

* cited by examiner

*Primary Examiner*—Haissa Philogene
(74) *Attorney, Agent, or Firm*—Gerald E. Hespos; Anthony J. Casella

(57) ABSTRACT

A vehicle lamp controlling device (1) is provided with a first driving circuit (11) for driving a lamp (L), a first control system (5) for turning the lamp (L) on by driving the first driving circuit (11) in accordance with the input of an ON-signal from the switch (SW), and a second control system (3, 9) for blinking the lamp (L) by intermittently controlling the driven state of the first driving circuit (11) in accordance with the ON-signal.

8 Claims, 2 Drawing Sheets

VEHICLE LAMP CONTROLLING DEVICE AND VEHICLE LAMP CONTROLLING METHOD

BACKGROUND OF THE INVENTION

1. Field of the Invention

The invention relates to a vehicle lamp controlling device and method for controllably blinking a lamp such as a stop lamp.

2. Description of the Related Art

A conventional stop-lamp merely is turned on as a brake pedal is worked. However, Japanese Unexamined Utility Model Publication No. H01-158340 and Japanese Unexamined Utility Model Publication No. H02-100850 disclose stop lamp controls that are intended to improve visibility by blinking the stop lamp as the brake pedal is worked. The stop lamp is made bankable by providing a control unit 100 between the lamp switch SW and the lamp L, as shown in FIG. 3.

However, the control unit 100 between the lamp switch SW and the stop lamp L creates a higher possibility of trouble in a control process from the lamp switch SW to the stop lamp L. The trouble may cause the stop lamp L to neither blink nor even be turned on even though the brake pedal is worked.

Accordingly, an object of the invention is to provide a lamp controlling device and method that can controllably turn a lamp on even if there is trouble in the lamp controlling device for blinking the lamp.

SUMMARY OF THE INVENTION

The invention relates to a vehicle lamp controlling device arranged between a switch and a lamp, the controlling device comprising a first driving circuit for driving the lamp, a first control system for turning the lamp on by driving the first driving means in accordance with input of an ON-signal from the switch, and a second control system for blinking the lamp by intermittently controlling a driven state of the first driving means in accordance with the input of the ON-signal.

The control system from the input of the ON-signal from the switch to the control of the first driving control is divided into the first control system that governs the driving of the first driving circuit (i.e. lighting of the lamp) and the second control system that governs at least a control, preferably the intermittent control of the driven state of the first driving means (i.e. blinking of the lamp). Thus, the lamp can be turned on by the first control system even if the lamp cannot be blinked due to trouble of the second control system.

The vehicle lamp controlling device may further comprise a first detecting means for detecting whether or not the ON-signal is inputted to the second control system.

The vehicle lamp controlling device may further comprise a second detecting means for detecting whether the lamp is on.

The vehicle lamp controlling device may further comprise a second driving means for driving the lamp.

The vehicle lamp controlling device preferably further comprises a control means for turning the lamp on or blinking the lamp by controlling the second driving means in the case that the first detecting means detects the input of the ON-signal to the second control system and the second detecting means detects that the lamp is not on.

According to a further embodiment of the invention, the vehicle lamp controlling device comprises a first detecting means for detecting whether the ON-signal is inputted to the second control system, a second detecting means for detecting whether the lamp is on, a second driving means for driving the lamp, and a control means for turning the lamp on or blinking the lamp by controlling the second driving means in the case that the first detecting means detects the input of the ON-signal to the second control system and the second detecting means detects that the lamp is not on. Thus, the lamp can be at least turned on even if the first control system or the first driving means has a trouble.

The second control system preferably includes an input circuit for inputting the ON-signal, and a control means for intermittently controlling the driven state of the first driving means in accordance with the input of the ON-signal from the input circuit. The vehicle lamp controlling device preferably further comprises a first detecting means for detecting whether the ON-signal is inputted to the control means, and a second detecting means for detecting whether the lamp is on, and the control means preferably blinks the lamp by intermittently controlling the driven state of the first driving means if the second detecting means detects that the lamp is on while the first detecting means does not detect the input of the ON-signal to the control means. Thus, the lamp can be blinked even if the input circuit of the second control system has a trouble.

The invention also relates to a vehicle lamp controlling method that may use the above-described vehicle lamp controlling device for controlling a lamp or other load in accordance with a signal from a switch. The method comprises turning on the lamp by means of a first control system by driving a first driving means in accordance with the input of an ON-signal from the switch, and at least turning on, preferably blinking the lamp by means of a second control system by controlling, preferably intermittently controlling, a driven state of the first driving means in accordance with the input of the ON-signal.

According to a preferred embodiment of the invention, the method further comprises performing a first detection for detecting whether the ON-signal is inputted to the second control system, performing a second detection for detecting whether the lamp is on, and turning the lamp on or blinking the lamp by controlling a second driving means in the case that in the first detection the input of the ON-signal to the second control system is detected and in the second detection it is detected that the lamp is not on.

The method preferably further comprises a control step by means of a control means for intermittently controlling the driven state of the first driving means in accordance with the input of an ON-signal from an input circuit of the second control system, a first detection for detecting whether the ON-signal is inputted to the control means, a second detection for detecting whether the lamp is on, and blinking the lamp by intermittently controlling the driven state of the first driving means in the case that in the second detection it is detected that the lamp is on while the input of the ON-signal to the control means is not detected in the first detection.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENT

Figure 1:
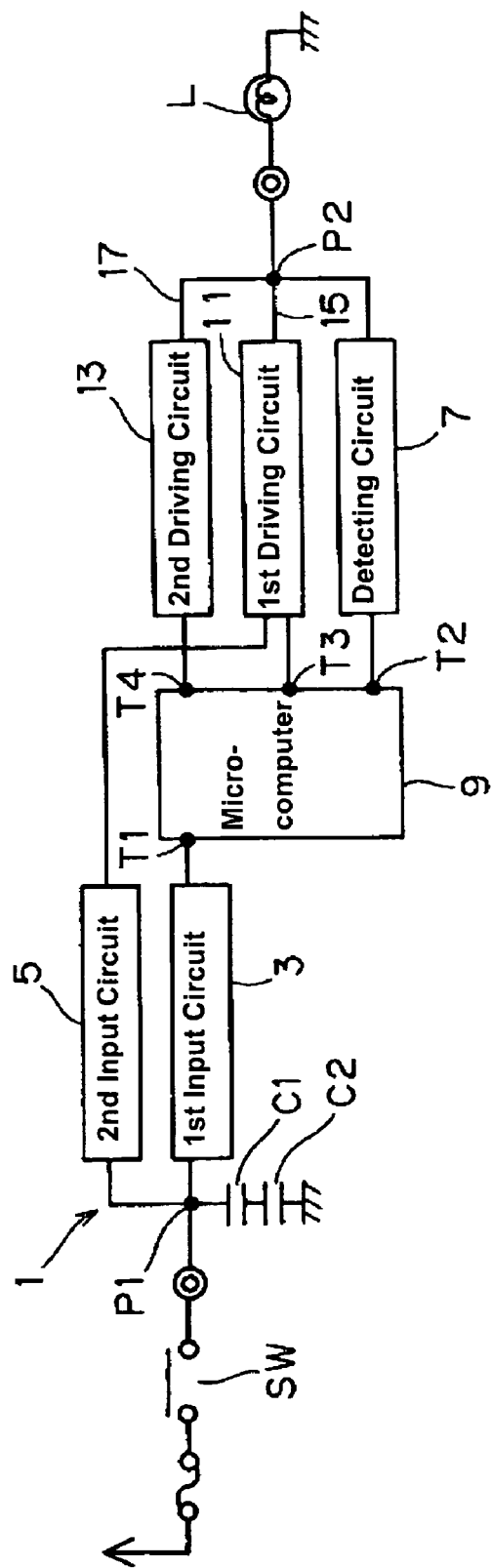
FIG. 1 is a schematic construction diagram of a vehicle lamp controlling device according to one embodiment of the invention.
Figure 2:
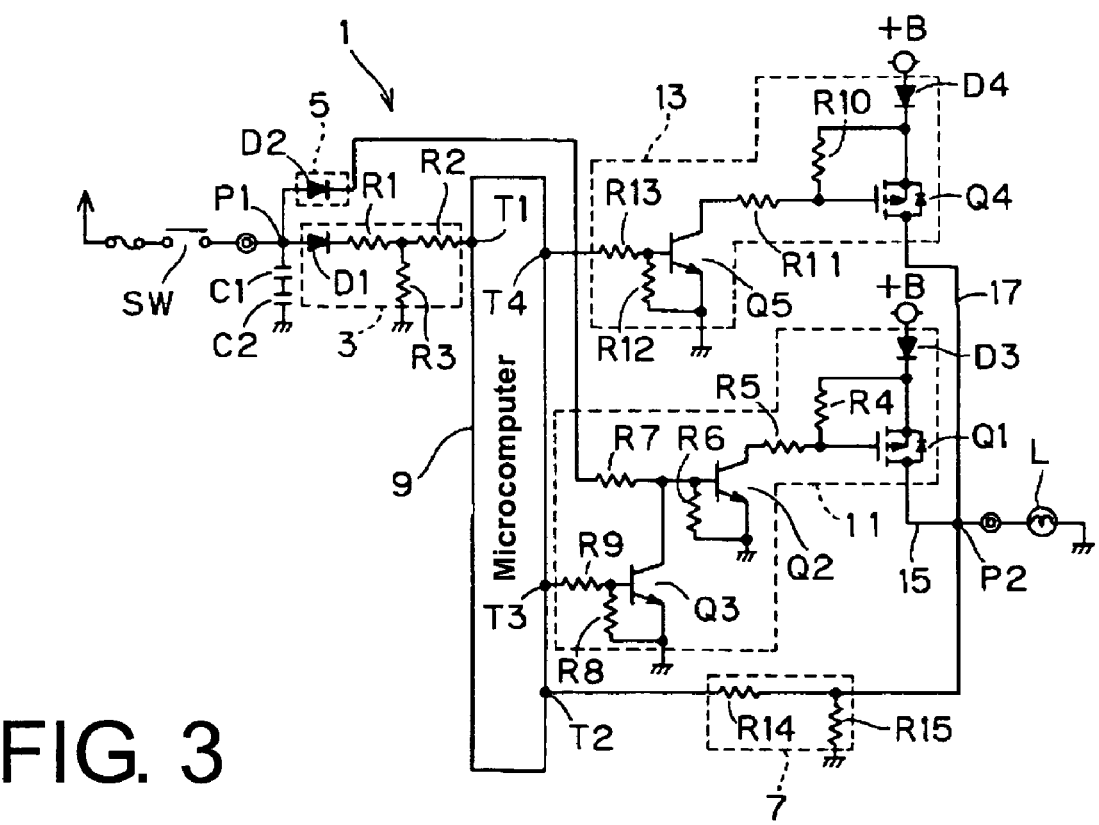
FIG. 2 is an exemplary circuit diagram of circuits constructing the vehicle lamp controlling device of FIG. 1.
Figure 3:
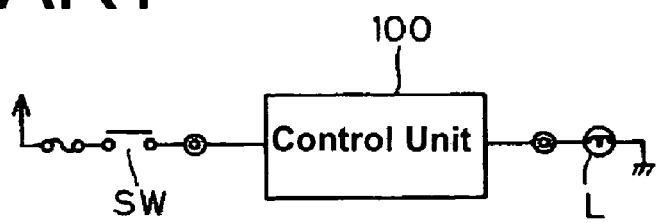
FIG. 3 is a schematic construction diagram of a prior art vehicle lamp controlling device.

A vehicle lamp controlling device 1 according to one preferred embodiment of the present invention is or is to be arranged between a switch SW and a lamp (e.g. stop or turn lamp) L (as a preferred intermittently controlled load) to blink the lamp L in accordance with an ON-signal from the switch SW and is provided with a first and a second input circuits 3, 5 to which the ON-signal is inputted, a detecting circuit 7 for detecting or sensing a turned-on state of the lamp L, a controller such as a microcomputer 9 for controlling the driving of driving circuits 11, 13 to be described later in accordance with signals from the respective circuits 3, 7, a first driving circuit (first driving means) 11 for turning the lamp L on in accordance with an ON-signal from the second input circuit 5 and blinking the lamp L by having its driven state intermittently controlled by the microcomputer 9, and a second driving circuit (second driving means) 13 for blinking the lamp L in accordance with the control of the microcomputer 9.

Here, a control system from the input of the ON-signal to the control of the first driving circuit 11 is divided into a first control system (P1→5→11) governing the driving (i.e. lighting of the lamp) of the first driving circuit 11 and a second control system (P1→3→9→11) governing the intermittent control of the driven state of the first driving circuit 11 (i.e. blinking of the lamp). The first driving circuit 11 functions as a driving circuit for a normal period, whereas the second driving circuit 13 functions as a fail-safe driving circuit.

The first input circuit (input circuit) 3 is constructed such that a forward-direction diode D1 and resistors R1, R2 are connected in series between the switch SW and an input terminal T1 of the microcomputer 9 in this order from the switch SW side and a resistor R3 is provided between a intermediate point between the respective resistors R1, R2 and a grounding point. The second input circuit 5 is constructed such that a forward-direction diode D2 is connected between a branch point P1 between the switch SW and the first input circuit 3 and a later described resistor R7 of the first driving circuit 11. It should be noted that one or more capacitors C1, C2 are connected in series between the branch point P1 and the grounding point.

The first and second driving circuits 11, 13 are respectively connected with first and second power supply lines 15, 17 provided in parallel between a power supplies +B and the lamp L.

The first driving circuit 11 is mainly comprised of a forward-direction diode D3 connected with the first power supply line 15, a switching element Q1 connected with a downstream side of the diode D3 on the first power supply line 15, a switching element Q2 for turning the switching element Q1 on and off in accordance with the ON-signal from the second input circuit 5, and a switching element Q3 for intermittently controlling the driven state of the switching element Q2 in accordance with the control of the microcomputer 9.

The switching element Q1 is constructed, for example, as a p-type MOSFET, a main electrode of which is connected with the first power supply line 15 and a control electrode of which is connected with the upstream-side main electrode via a resistor R4 and branched or connected to an upstream-side main electrode of the switching element Q2 via a resistor R5. The switching element Q2 is constructed, for example, as an npn transistor, main electrodes of which are connected between the resistor R5 and a grounding point and a control electrode of which is branched or connected to the downstream-side main electrode thereof via a resistor R6 and to an output side (cathode side of the diode D2) of the second input circuit 5 via a resistor R7. The switching element Q3 is constructed, for example, as an npn transistor, main electrodes of which are connected with the control electrode of the switching element Q2 and a grounding point and a control electrode of which is branched or connected to the downstream-side main electrode thereof via a resistor R8 and to an output terminal T3 of the microcomputer 9 via a resistor R9.

By adopting this construction, when the ON-signal (ON-current) from the second input circuit 5 is inputted to the resistor R7 of the first driving circuit 11, this ON-current flows into the grounding point after being applied to the resistors R7, R6, and the switching element Q2 is turned on by a voltage drop at the resistor R6 at this time. By turning the switching element Q2 on, a power supply current of the power supply +B flows into the grounding point after being applied to the diode D3, the resistors R4, R5 and the switching element Q1, whereby the switching element Q1 is turned on by a voltage drop at the resistor R4 at this time. By turning the switching element Q1 on, the power supply current of the power supply +B flows into a grounding point after being applied to the diode D3, the switching element Q1 and the lamp L, thereby turning the lamp L on. In this way, the first driving circuit 11 is driven in accordance with the ON-signal from the second input circuit 5, thereby turning the lamp L on.

If a control signal (intermittent control signal) from the output terminal T3 of the microcomputer 9 is inputted to the resistor R9 of the first driving circuit 11 in this state, it flows into the grounding point after being applied to the resistors R9, R8, whereby the switching element Q3 is intermittently turned on by intermittent voltage drops at the resistor R8 at this time. By intermittently turning the switching element Q3 on, the ON-current flowing into the grounding point after being applied to the resistors R7, R6 intermittently drains into the grounding point via the resistor R7 and the switching element Q3, whereby the voltage drop at the resistor R6 is intermittently canceled to intermittently turn the switching element Q2 on and off. This causes the switching element Q1 to be intermittently turned on and off to blink the lamp L. In this way, the lamp L is blinked by intermittently controlling the driven state of the first driving circuit 11 in accordance with the control of the microcomputer 9.

The second driving circuit 13 functions as a fail-safe circuit and is mainly comprised of a forward-direction diode D4 to be connected with the second power supply line 17, a switching element Q4 connected with a downstream side of the diode D4 on the second power supply line 17, and a switching element Q5 for turning the switching element Q4 on and off in accordance with the control of the microcomputer 9.

The switching element Q4 is constructed, for example, as a p-type MOSFET, main electrodes of which are connected with the second power supply line 17 and a control electrode of which is branched or connected to the upstream-side main electrode thereof via a resistor R10 and to an upstream-side main electrode of the switching element Q5 via a resistor R11. The switching element Q5 is constructed, for example, as an npn transistor, main electrodes of which are connected with the resistor R11 and a grounding point and a control electrode of which is branched or connected to the downstream-side main electrode thereof via a resistor R12 and to an output terminal T4 of the microcomputer 9 via a resistor R13.

By adopting this construction, when a control signal (e.g. intermittent control signal) from the output terminal T4 of the microcomputer 9 is inputted to the resistor R13 of the second driving circuit 13, this control signal flows into the grounding point after being given to or passing the resistors R13, R12, and the switching element Q5 is intermittently turned on and off by intermittent voltage drops at the resistor R12 at this time. By intermittently turning the switching element Q5 on and off, a power supply current of the power supply +B flows into the grounding point via the diode D4, the resistors R10, R11 and the switching element Q5, whereby the switching element Q4 is intermittently turned on and off by intermittent voltage drops at the resistor R10 at this time. By intermittently turning the switching element Q4 on and off, the power supply current of the power supply +B flows into the grounding point after being applied to the diode D4, the switching element Q4 and the lamp L, thereby blinking the lamp L. In this way, the second driving circuit 13 is driven in accordance with the control of the microcomputer 9 to blink the lamp L.

The detecting circuit 7 inputs a part of the power supply current supplied from the first driving circuit 11 to the lamp L to an input terminal T2 of the microcomputer 9, and includes a resistor R14 connected between a junction point P2 of the power supply lines 15, 17 and the input terminal T2 of the microcomputer 9, and a resistor R15 connected between a intermediate point between the resistor R14 and the junction point P2 and a grounding point.

The microcomputer 9 has a first detecting function (first detecting means), a second detecting function (second detecting means), and/or a controlling function (control means). The first detecting function detects whether or not the ON-signal from the switch SW is being inputted to the microcomputer 9 based on the presence or absence of the signal input (i.e. input of the ON-signal from the switch SW) to the input terminal T1. The second detecting function detects whether or not the lamp L is on based on the presence or absence of the signal input (i.e. branched input of the power supply current supplied from the first driving circuit 11 to the lamp L) to the input terminal T2. The controlling function causes the microcomputer 9 to output a control signal to the switching element Q3 of the first driving circuit 11 from its output terminal T3 to blink the lamp L by intermittently controlling the driven state of the first driving circuit 11 as described above in the case the first detecting function detects the input of the ON-signal from the switch SW to the microcomputer 9 and the second detecting function detects that the lamp L is on (i.e. in the case that the device 1 is in its normal state), whereas this function causes the microcomputer 9 to output a control signal to the switching element Q5 of the second driving circuit 13 from its output terminal T4 to blink (or turn on) the lamp L by controlling the driving of the second driving circuit 13 as above in the case that the first detecting function detects the input of the ON-signal from the switch SW to the microcomputer 9 and the second detecting function detects that the lamp L is not on.

Next, the operation of this vehicle lamp controlling device 1 is described.

During a normal period, the ON-signal from the switch SW is outputted to the input terminal T1 of the microcomputer 9 via the first input circuit 3 and to the resistor R7 of the first driving circuit 11 via the second input circuit 5. The first driving circuit 11 is driven by this ON-signal inputted to the resistor R7 of the first driving circuit 11 (i.e. the respective switching elements Q2, Q1 are successively turned on), the power supply current is supplied from the first driving circuit 11 to the lamp L to turn the lamp L on, and a part of the power supply current is inputted to the input terminal T2 of the microcomputer 9 via the detecting circuit 7. If the ON-signal is inputted to the input terminal T1 of the microcomputer 9 (i.e. the input of the ON-signal to the microcomputer 9 is detected) and the part of the power supply current is inputted to the input terminal T2 of the microcomputer 9 (i.e. the lighting of the lamp L is detected or sensed), the microcomputer 9 judges a normal period and outputs a control signal from the output terminal T3 to the resistor R9 of the first driving circuit 11 to intermittently control the driven state of the first driving circuit 11 (i.e. the respective switching elements Q2, Q1 in their ON-states are intermittently turned off by intermittently turning the switching element Q3 on), thereby blinking the lamp L. In this way, the lamp L is blinked in accordance with the ON-signal from the switch SW.

On the other hand, when the first input circuit 3 has a trouble, the ON-signal from the switch SW is outputted to the resistor R7 of the first driving circuit 11 via the second input circuit 5. Thus, the first driving circuit 11 is driven by the ON-signal inputted to the resistor R7 of the first driving circuit 11 as during the normal period, thereby turning the lamp L on. However, since the ON-signal is not outputted to the microcomputer 9 via the first input circuit 3, the driven state of the first driving circuit 11 is not intermittently controlled by the microcomputer 9, with the result that the lamp L is not blinked. In this way, the lamp L is at least turned on even when the first input circuit 3 has a trouble.

In this case, a part of the power supply current supplied from the first driving circuit 11 to the lamp L is inputted to the input terminal T2 of the microcomputer 9 via the detecting circuit 7. If there is no input of the ON-signal to the input terminal T1 of the microcomputer 9 (i.e. the input of the ON-signal to the microcomputer 9 is not detected) and a part of the power supply current is inputted to the input terminal T2 of the microcomputer 9 (i.e. the lighting of the lamp L is detected), the microcomputer 9 may judge that the first input circuit 3 has a trouble and may output a control signal from the output terminal T3 to the resistor R9 of the first driving circuit 11 as during the normal period, thereby intermittently controlling the driven state of the first driving circuit 11 to blink the lamp L. In this way, the lamp L is blinked even when the first input circuit 3 has a trouble.

On the other hand, when the second input circuit 5 or the first driving circuit 11 has a trouble, the ON-signal from the switch SW is inputted to the input terminal T1 of the microcomputer 9 via the first input circuit 3, but not inputted to the resistor R7 of the first driving circuit 11 via the second input circuit 5 (in the case that the second input circuit 5 has a trouble) or the first driving circuit 11 is not driven even if the ON-signal is inputted to the resistor R7 of the first driving circuit 11 via the second input circuit 5 (in the case that the first driving circuit 11 has a trouble). Thus, in either case, the lamp L is not turned on by the first driving circuit 11 (accordingly, a part of the power supply current is not inputted to the input terminal T2 of the microcomputer 9). In this way, if the ON-signal is inputted to the input terminal T1 of the microcomputer 9 (i.e. the input of the ON-signal to the microcomputer 9 is detected) and a part of the power supply current is not inputted to the input terminal T2 of the microcomputer 9 (i.e. the lighting of the lamp L is not detected), the microcomputer 9 judges that either the second input circuit 5 or the first driving circuit 11 has a trouble and outputs a control signal from the output terminal T4 to the resistor R13 of the second driving circuit 13, thereby driving the second driving circuit 13 (i.e. successively turning the switching elements Q5, Q4 on and off) to blink the lamp L (or turn the lamp L on). In this way, the lamp L is at least turned on even when the second input circuit 5 has a trouble.

On the other hand, if the microcomputer 9 has a trouble, the ON-signal from the switch SW is inputted to the input terminal T1 of the microcomputer 9 via the first input circuit 3 and also to the resistor R7 of the first driving circuit 11 via the second input circuit 5. Thus, the first driving circuit 11 is driven by the ON-signal inputted to the resistor R7 of the first to turn the lamp L on as during the normal period, but the lamp L is not blinked since the driven state of the first driving circuit 11 is not intermittently controlled by the microcomputer 9. In this way, the lamp L is at least turned on even when the microcomputer 9 has a trouble.

As described above, according to the vehicle lamp controlling device 1, the control system from the input of the ON-signal from the switch SW to the control of the first driving circuit 11 is divided into the first control system 5 governing the driving (i.e. lighting of the lamp L) of the first driving circuit 11 and the second control system 3, 9 governing the intermittent control (i.e. blinking of the lamp L) of the driven state of the first driving circuit 11. Thus, even if the lamp L cannot be blinked due to the trouble of the second control system 3, 9, the lamp L can be turned on by the first control system 5, 11.

Further, if the input of the ON-signal from the switch SW to the microcomputer 9 (second control system) is detected and the lamp L is detected not to be on (i.e. if either the first control system 5 or the first driving circuit 11 has a trouble), the microcomputer 9 drives the second driving circuit 13 to blink (or turn on) the lamp L. Thus, the lamp L can be at least turned on even when the first control system 5 or the first driving circuit 1 has a trouble.

Furthermore, if the lamp L is detected to be on while the input of the ON-signal to the microcomputer 9 is not detected (i.e. if the first input circuit 3 has a trouble), the microcomputer 9 intermittently controls the driven state of the first driving circuit 11. Thus, even if the first input circuit 3 has a trouble, the lamp L can be blinked.

Accordingly, to provide a vehicle lamp controlling device which can at least turn a lamp on even upon an occurrence of a trouble, a vehicle lamp controlling device 1 is provided with a first driving circuit 11 for driving a lamp L, a first control system 5 for turning the lamp L on by driving the first driving circuit 11 in accordance with the input of an ON-signal from the switch SW, and a second control system 3, 9 for at least turning the lamp on, preferably for blinking the lamp L by intermittently controlling the driven state of the first driving circuit 11 in accordance with the ON-signal.

What is claimed is:

1. A vehicle lamp controlling device to be arranged between a switch and a lamp, comprising:
    a first driving means for driving the lamp,
    a first control system for turning the lamp on by driving the first driving means in accordance with the input of an ON-signal from the switch,
    a second control system for at least turning on, the lamp by controlling a driven state of the first driving means in accordance with the input of the ON-signal, and
    a first detecting means for detecting whether the ON-signal is inputted to the second control system.

2. The vehicle lamp controlling device of claim 1, further comprising a control means for turning the lamp blinking the lamp by controlling the second driving means in the case that the first detecting means detects the input of the ON-signal to the second control system and the second detecting means detects that the lamp is not on.

3. The vehicle lamp controlling device of claim 1, further comprising a second detecting means for detecting whether the lamp (L) is on.

4. The vehicle lamp controlling device of claim 1, further comprising a second driving means for driving the lamp.

5. A vehicle lamp controlling device to be arranged between a switch and a lamp, comprising:
    a first driving means for driving the lamp,
    a first control system for turning the lamp on by driving the first driving means in accordance with the input of an ON-signal from the switch,
    a second control system for blinking the lamp by intermittently controlling a driven state of the first driving means in accordance with the input of the ON-signal,
    a first detecting means for detecting whether the ON-signal is inputted to the control means, and a second detecting means for detecting whether the lamp is on, and
    the control means blinks the lamp by intermittently controlling the driven state of the first driving means in the case that the second detecting means detects that the lamp is on while the first detecting means does not detect the input of the ON-signal to the control means.

6. A vehicle lamp controlling device to be arranged between a switch and a lamp, comprising:
    a first driving means for driving the lamp,
    a first control system for turning the lamp on by driving the first driving means in accordance with the input of an ON-signal from the switch, and
    a second control system for at least turning on the lamp by controlling a driven state of the first driving means in accordance with the input of the ON-signal, the second control system including an input circuit for inputting the ON-signal, and a control means for intermittently controlling the driven state of the first driving means in accordance with the input of the ON-signal from the input circuit.

7. A vehicle lamp controlling method for controlling a lamp in accordance with a signal from a switch, the method comprising:
    turning on the lamp by a first control system by driving a first driving means in accordance with input of an ON-signal from the switch,
    blinking the lamp by a second control system by intermittently controlling a driven state of the first driving means in accordance with the input of the ON-signal, and
    performing a first detection for detecting whether the ON-signal is inputted to the second control system,
    performing a second detection for detecting whether the lamp is on, and
    blinking the lamp by controlling a second driving means in the case that in the first detection the input of the ON-signal to the second control system is detected and in the second detection it is detected that the lamp is not on.

8. The method of claim 7 further comprising:
a control step of a control means for intermittently controlling the driven state of the first driving means in accordance with the input of an ON-signal from an input circuit of the second control system,
a first detection for detecting whether the ON-signal is inputted to the control means,
a second detection for detecting whether the lamp is on, and
blinking the lamp by intermittently controlling the driven state of the first driving means in the case that in the second detection it is detected that the lamp is on while the input of the ON-signal to the control means is not detected in the first detection.

* * * * *